Figure 1:
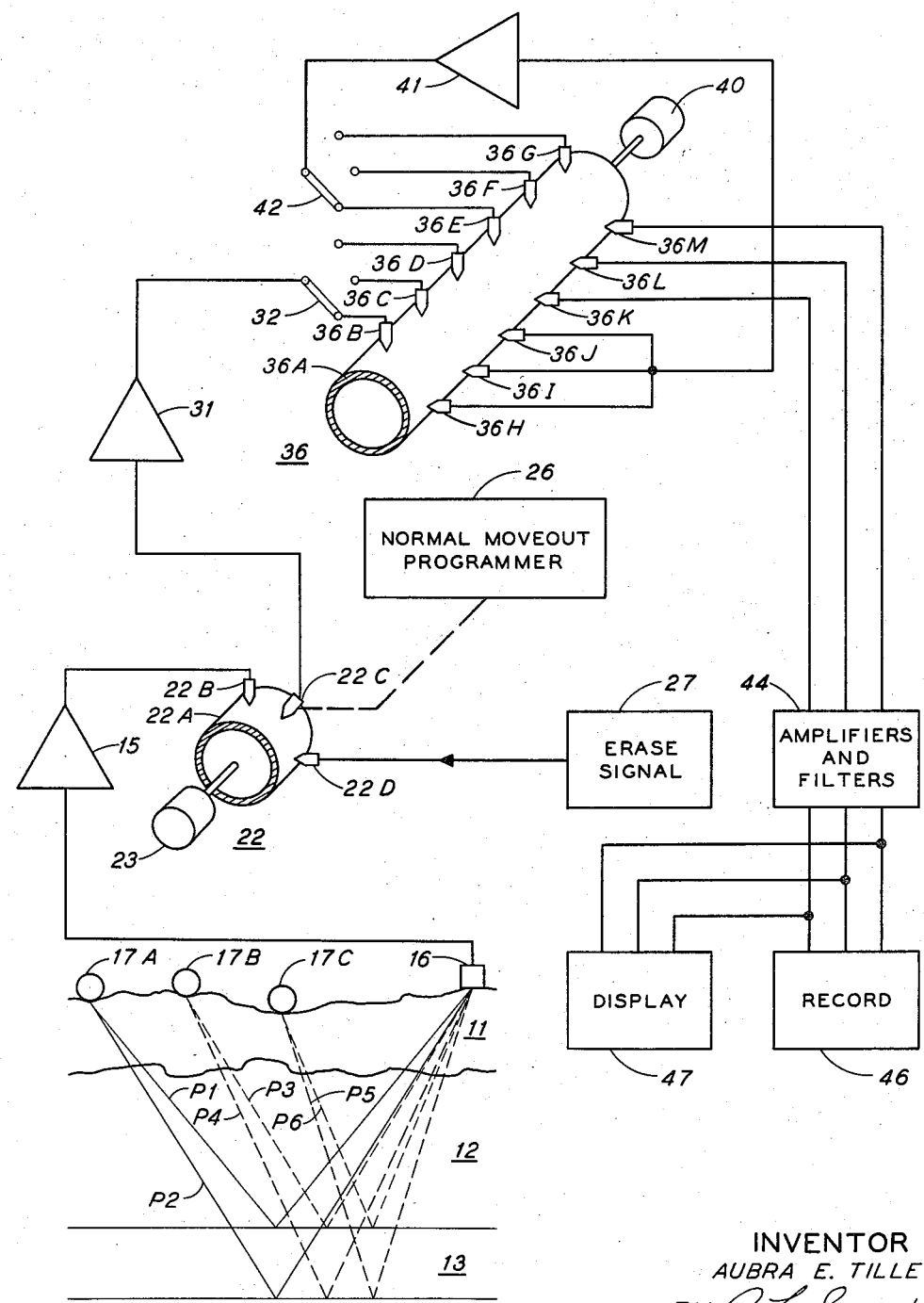

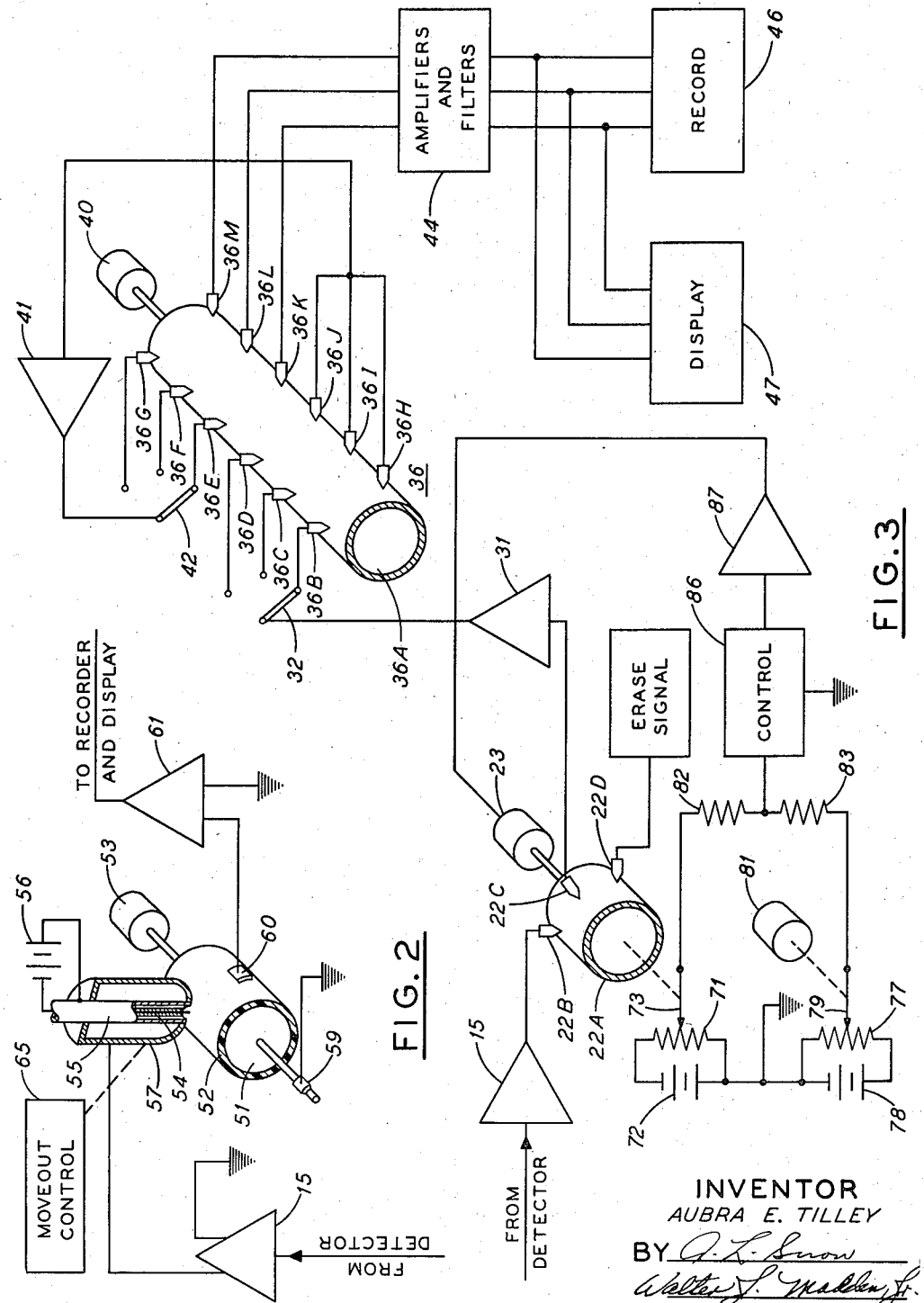

March 31, 1959 A. E. TILLEY 2,879,860
SEISMIC PROSPECTING UTILIZING TRACE INTEGRATION
Filed Oct. 11, 1954 2 Sheets-Sheet 1

INVENTOR
AUBRA E. TILLEY
BY
ATTORNEYS

United States Patent Office 2,879,860
Patented Mar. 31, 1959

2,879,860

SEISMIC PROSPECTING UTILIZING TRACE INTEGRATION

Aubra E. Tilley, Fullerton, Calif., assignor to California Research Corporation, San Francisco, Calif., a corporation of Delaware Application October 11, 1954, Serial No. 461,338

5 Claims. (Cl. 181—.5)

This invention relates in general to seismic prospecting, and relates more specifically to methods and apparatus for improving the quality of data obtained in the reflection method of seismic prospecting.

In the art of seimic prospecting, seismic waves artificially generated in the earth are utilized to actuate seismic detectors which are responsive to reflections and refractions of the waves from subsurface strata to produce electrical output signals varying in sympathy with the movement of the earth adjacent the detectors. Ideally, the output signal of such a detector would have substantially no amplitude during the portion of the disturbance in which no reflections arrived at the detector and would abruptly increase in amplitude upon arrivals of energy reflected from different subsurface interfaces, the signal then consisting of a series of decaying transients separated by portions of substantially zero amplitude.

However, in practice, a great deal of so-called noise is contained in the detector output, with the result that the portion of interest of the detector ouput may be obscured. Such noise may stem from a variety of causes, such as reflections of energy from boulders or other reflecting objects in the ground, reverberations from cavernous areas in the subsurface strata, or other inhomogeneities in the earth.

Numerous methods have been proposed for increasing the signal-to-noise ratio of the seismic detector outputs, and the most common of such proposals is to combine or mix the outputs of different detectors in an effort to randomize and thereby cancel some of the noise present in the different detector outputs while reinforcing the signal portions. Among such methods for mixing is the trace integration method, in which a series of seismic disturbances is sequentially produced at spaced-apart points and the energy produced by each of the disturbances is detected at a fixed point or area and each of the resulting signals reproducibly recorded. After a predetermined number of such disturbances, the resultant recorded traces are combined or mixed to form a single composite trace in which the noise in each of the individual detector outputs is randomized and the signal portion of the output is accentuated to thus increase the signal-to-noise ratio.

In the trace integration method, it is essential that the different traces be in the proper phase relationship in order to obtain the desired reinforcement of reflections, since if the traces to be mixed do not have the proper phase relationship, the reflections therein will tend to subtract from each other rather than to reinforce. In such trace integration, the intertrace time variations may be divided into two categories—those which have a substantially constant value for the duration of a given seismic disturbance and those whose magnitude is variable as between the different disturbances.

Among the causes of the substantially constant time delays or variations are differences in the elevation of the shot point from disturbance to disturbance and differences in the thickness of the weathering layer of the earth underneath the different shot points. The most important cause of variable time delays is the fact that the different shot points are different distances from the detector or detector group and energy reflected from a given subsurface interface arrives at the detector or detector group sooner for shot points nearer the detector than it does for shot points farther from the detector. This time delay, commonly referred to as normal moveout time, has its maximum value for reflections from relatively shallow reflecting horizons, since the differences in the distances from the reflecting horizon to the different shot points are larger relative to the total reflection travel distance for the shallow reflections than such differences are for deeper reflections. Thus, the normal moveout time decreases in value during the seismic disturbance and becomes substantially zero when the differences in the distances from the reflecting horizon to the different shot points becomes negligible with respect to the total travel distance.

Thus, it becomes essential that the different intertrace time variations, both those which are substantially constant and those which have a variable value from disturbance to disturbance, be compensated for prior to mixing or integrating in order to obtain the maximum increase in the signal-to-noise ratio of the composite signal.

Broadly, the present invention contemplates methods and apparatus for seismic prospecting in which a plurality of spaced seismic disturbances is sequentially produced, and the energy from each of the disturbances is detected and converted into an electrical signal. Each of the signals thus produced is varied in time sequence in accordance with the normal moveout function for the location of the given disturbance relative to the detector, and each of the normal moveout-corrected signals is reproducibly recorded. After a predeterminable number of such disturbances, the resulting moveout-corrected signals are reproduced with fixed time compensations therebetween corresponding to the substantially constant time delays between the arrivals of energy at the detector from the different disturbances, and these signals are then mixed or integrated to produce a composite signal.

The moveout-corrected signals may be recorded on a suitable reproducible recording medium such as a rotatable cylinder or drum having a layer of magnetizable material on the periphery thereof. The moveout-corrected signals are recorded side by side by recording heads and are reproduced by reproducing heads overlying each of the channels. The reproducing heads may be shifted about the periphery of the drum to introduce effective time shifts in the reproduced signals corresponding to the desired time delays, and the signals are reproduced and mixed to form the desired composite signal.

Alternatively, the moveout-corrected signals may be recorded on a single-channel recording device having an electrostatic charge-modifiable surface on which each of the signals may be sequentially recorded to produce a resultant charge modification on the recording surface corresponding to the sum of the individual signals. The composite signal may then be withdrawn from the electrostatic storage medium and supplied to a permanent recording device, such as an oscillographic camera, to produce a permanent record of the composite trace, and the electrostatic storage medium prepared for the next series of signals.

Among the objects of this invention, therefore, are to provide improved methods of, and apparatus for, seismic exploration wherein a series of sequentially produced seismic signals is combined in the proper time relationships to produce a composite signal in which the reflections of interest are emphasized relative to the back-ground noise; wherein each of a series of sequentially produced seismic detector signals is reproducibly recorded with compensation for the effect of normal moveout and the moveout-compensated signals are reproduced with fixed time delays therebetween and combined to produce a composite trace; and wherein each of a series of sequentially produced seismic detector signals is impressed on an electrostatic, charge-modifiable storage surface with appropriate time variations to produce a composite signal corresponding to the sum of the individual signals.

The invention will be better understood, and additional objects and advantages of it will become apparent, in the course of the ensuing description of some preferred embodiments of the invention, such description being taken in connection with the accompanying drawings, wherein:

Fig. 1 is a schematic diagram of equipment utilized in this invention, together with an idealized diagram of a cross-section of a terrain to be explored by the method of this invention;

Fig. 2 is a diagram, partly in block form and partly schematic, of an alternate embodiment of the present invention utilizing an electrostatic, charge-modifiable surface to record and combine the sequentially produced seismic detector signals; and Fig. 3 is a schematic diagram of an alternate embodiment of the present invention utilizing variations in the speed of the reproducible recording medium to effect normal moveout compensation.

Referring to Fig. 1, there is shown an idealized diagram of a cross-section of a terrain to be explored by the method of this invention. The terrain contains a weathered layer 11 overlying strata 12, 13 and 14. Means shown diagrammatically at 16 are provided for detecting the seismic energy produced by a source of seismic energy and reflected back to the surface of the earth from the interfaces between the underlying strata. Means 16 may be a single seismic detector, but preferably it is a plurality of such detectors arranged in any suitable configuration and having a common output connected to an amplifier 15.

The source of seismic energy may be of any suitable known type, such as explosives, disposed either above, on, or below the surface of the earth. However, from the standpoint of economy and speed, when a series of sequential seismic disturbances is to be produced, as in this invention, the seismic source is preferably an elevated weight which may be dropped on the ground at desired intervals and rapidly moved between dropping points. The different positions of origin of the sequentially produced seismic disturbances are designated by reference numerals 17A, 17B, 17C, corresponding to the sequential production of seismic disturbances at these points, such as by the dropping of a weight at each of the points.

When the source is at position 17A, energy reflected from the interface between strata 12 and 13 travels by path $P_1$ to detector 16, and energy reflected from the interface between strata 13 and 14 travels path $P_2$ in reaching detector 16. Similarly, when the source occupies the position designated at 17B, energy radiated therefrom travels along paths $P_3$ and $P_4$, respectively, in reaching detector 16 after reflection from the interfaces between strata 12 and 13 and between strata 13 and 14. Further, when the source occupies a position designated by reference character 17C, paths $P_5$ and $P_6$ are traversed by the energy in reaching detector 16 after reflection from the two interfaces.

It will be seen from the cross-sectional view of the terrain that the thickness of the weathered layer 15 through which the different reflections travel is different for each of the shot points, and also that the elevations of these different shot points are different. It is, therefore, necessary to correct the detector signals for the effects on the travel times of the reflected energy of these different thicknesses of weathered layer and differences in shot point elevation.

In making the weathering corrections, it is possible to assume that they are the same for all directions of arrival of the seismic waves, since the velocity of wave propagation through the weathered layer is very much lower than in the consolidated strata beneath it. As a result, the waves passing from the underlying stratum into the weathered layer are bent toward the vertical, and since the difference in velocity between the weathered layer and the underlying stratum is substantial, the error involved in assuming that the waves do travel vertically through the weathered layer is negligible. Therefore, the time variations produced by the weathering correction may be considered to be substantially constant for a given spacing of the shot point and detector throughout the duration of the seismic disturbance. Similarly, the time variations produced by differences in the elevations of the several shot points may be considered to be substantially constant for a given spacing of the shot point and detector throughout the seismic disturbance.

An additional factor producing differences in times of arrival of energy reflected from a given reflecting horizon is that the different shot points or source positions are different distances from the detector 16. Thus, energy radiated from position 17A and reflected from the interface between strata 12 and 13 will take longer to reach detector 16 than energy reflected from this interface when the source is in position 17B. Similarly, energy reflected from the interface between strata 12 and 13 when the source is at 17B will have a longer travel time than similar reflections of energy when the source is at position 17C, and so on for other positions of the source approaching detector 16.

With respect to the travel times of reflections from the interface between strata 13 and 14, energy transmitted when the source is at position 17A will have a longer travel time than that transmitted from position 17B, which energy, in turn, will have a longer travel time than that transmitted from position 17C. However, the differences in travel times for the different reflections from the interface between strata 13 and 14 will not be as large as the differences in travel times for the different reflections from the interface between strata 12 and 13. Thus, the normal moveout time is a function having its maximum value for reflections from shallow reflecting horizons and progressively decreasing in value for subsequent reflections from deeper horizons. The variations of the moveout time as a function of the time elapsing after the shot will, of course, depend upon the particular velocity functions involved in the terrain being explored, but, in general, moveout functions decrease non-linearly.

To accurately mix the different output signals of detector 16 for the different seismic disturbances, it is necessary that similar events or reflections in each of the different signals be in proper phase for such mixing in order to increase the magnitude of the reflection in the mixed signal relative to the surrounding noise. To accurately compensate for the time variations between the occurrence of similar events in the different signals, the signals should be varied in time sequence by substantially fixed amounts and also by amounts having a value varying during the duration of the signal.

To accomplish such mixing, the output of detector 16 is supplied through amplifier 15 to a recording head of a suitable reproducible recording device, such as a recorder 22 having a recording medium in the form of a cylindrical layer 22A of magnetizable material. The drum or rotor on which recording medium 22A is disposed is driven by a motor 23. Recorder 22 is provided with a recording head 22B and a reproducing head 22C for reproducing the information recorded by head 22B. Reproducing head 22C is movable about the periphery of medium 22A, and such movement is controlled, as shown by the dotted line, by a device 26 for programming the movement in accordance with the normal moveout function involved in the particular signal under consideration. Recorder 22 is also provided with an erasing or obliterating device 22D which is supplied with an erasing signal from a source 27 for erasing the recorded signal from medium 22A after it has been reproduced.

The output from reproducing head 22C is supplied through an amplifier 31 and through a selector switch 32 to a selected recording channel on a reproducible recording device 36 having a cylindrical recording medium 36A disposed on a rotor driven by a motor 40. Recording device 36 is provided with a plurality of recording heads 36B, 36C, 36D, 36E, 36F and 36G, and a plurality of reproducing heads 36H, 36I, 36J, 36K, 36L and 36M. Selector switch 32 controls the input connection to recording heads 36B, 36C and 36D. Reproducing heads 36H, 36I and 36J, corresponding, respectively to recording heads 36B, 36C and 36D, are connected together to a common output which is supplied through an amplifier 41 to a selector switch 42 which controls the input to recording heads 36E, 36F and 36G. Reproducing heads 36K, 36L and 36M, corresponding to recording heads 36E, 36F and 36G, are connected through an amplifying and filtering network 44 to recording device 46 and/or a display device 47.

In the operation of this invention, assuming that the source of seismic energy is at position 17A, upon activation of the source, energy produced thereby travels through the earth along the paths described above and is converted by detector 16 into an electrical output signal which is supplied through amplifier 15 to recording head 22B. With recorder 22 rotating, the signal is recorded on medium 22A by recording head 22B and then passes under reproducing head 22C, where the signal is reproduced.

During such reproduction, reproducing head 22C is driven by normal moveout programmer 26 in accordance with the normal moveout function corresponding to the spacing between detector 16 and source point 17A. Movement of reproducing head 22C during reproduction of the recorded signal effects a variation in the relative time sequence of events in the reproduced signal to provide continuous automatic moveout compensation. After passage under reproducing head 22C, the recorded signal passes under erase head 22D where the recorded information is erased and the recording medium prepared for additional recording. The signal from reproducing head 22C is supplied through amplifier 31 and selector switch 32 which, in this case, is connected to recording head 36B to record the moveout-corrected signal on medium 36A.

The source of seismic energy may then be moved to the position designated by reference character 17B and again activated to produce energy which is detected by detector 16 and supplied through amplifier 15 to recording head 22B. Reproducing head 22C is again driven by normal moveout programmer 26 in a manner to compensate the reproduced signal for the effects of normal moveout. Switch 32 is moved to connect recording head 36C to amplifier 31 so that the moveout-corrected signal is supplied from reproducing head 22C through amplifier 31 and recorded on the channel lying under recording head 36C. It will be understood that the compensation introduced by programmer 26 into the detector signal produced when the source is at position 17A will be different from the compensation introduced into the signal produced when the source is at position 17B, since these two positions of the source are different distances from detector 16.

The operation is then continued with the source at position 17C and successive positions until the desired number of traces to be mixed or integrated has been obtained. To mix the individual signals or traces, reproducing heads 36H, 36I and 36J are shifted different amounts about the periphery of medium 36A corresponding to the time delays to be inserted in the different signals to compensate for the effects of the differences in elevation and weathered layer thickness of the different source points 17A, 17B and 17C. With heads 36H, 36I and 36J having the desired time shifts, the signals are reproduced from the different channels and combined into one composite signal in which reflections are reinforced owing to the proper phase relationships of the reflections in the mixed signals, and noise present in the signals is randomized to some extent by the mixing. The composite signal is supplied through amplifier 41 and selector switch 42 to recording head 36E. The signals underlying recording heads 36B, 36C and 36D may then be erased or otherwise obliterated to prepare these channels for recording additional signals thereon.

After again obtaining the desired number of signals from detector 16 and recording these signals through recording heads 36B, 36C and 36D with normal moveout compensation, the signals may be reproduced through reproducing heads 36H, 36I and 36J and transferred into the next storage channel 36F. This procedure is continued until either the storage capacity of the recording medium is realized or the desired seismic profile has been completed.

The final composited signals recorded by recording heads 36E, 36F and 36G may then be reproduced through reproducing heads 36K, 36L and 36M, respectively, and supplied through amplifying and filtering network 44 to recorder 46 to produce a permanent record of the composited signals. The composited signals also may be displayed on display device 47 to permit rapid visual evaluation of the effects of the compositing.

Fig. 2 diagrammatically illustrates an alternate embodiment of this invention utilizing an electrostatic, charge-modifiable surface on which the signals may be recorded. As shown in Fig. 2, the signal from detector 16 is supplied through amplifier 15 to a recording device comprising an electrically conductive rotor 51 driven by a motor 53 and having a layer 52 of a suitable dielectric material about its periphery. Suitable means are provided for producing free ions near the surface of layer 52, and such means may be in the form of a pair of concentric electrodes 54 and 55 connected to a suitable source of voltage 56. Electrodes 54 and 55 are insulated from each other except at their respective ends adjacent layer 52. Upon application of a suitable voltage from source 56, an arc is drawn between the ends of the electrodes to produce the desired free ions adjacent layer 52. Electrodes 54 and 55 are surrounded by an electrically conductive shield member 57. The assembly, including electrodes 54 and 55 and member 57, is driven during recording by a moveout programmer 65, as shown by the dotted line, to compensate the recorded signal for normal moveout, in a manner similar to that described above in connection with the embodiment of Fig. 1.

Shield member 57 is connected to one output terminal of amplifier 15, and the other output terminal of amplifier 15 is connected through ground to a commutator 59 riding on an electrically conductive shaft connected to rotor 51. The output signal from amplifier 15 is thus impressed across the dielectric between shield 57 and rotor 51, the dielectric consisting of a small air gap and material 52. As the rotor 51 and recording medium 52 rotate, variations in the magnitude of the seismic detector signal, as represented by the output of amplifier 15, are impressed across the dielectric to produce variations in the charge distribution on layer 52 corresponding to variations in the amplitude of the seismic detector signal. During such recording, moveout programmer 65 drives the recording assembly to compensate the recorded signal for normal moveout. Additionally, the recording assembly may be given a fixed shift about the periphery of medium 52 for the different recorded signals to provide compensation for those time variations among the different signals which are of substantially constant magnitude throughout a disturbance.

The next output signal from detector 16, corresponding to the seismic disturbance resulting from the next position of the seismic source, is similarly impressed across the dielectric of the recording device on the same channel of the recorder on which the first signal was impressed. Recording medium 52 has the property of producing a resultant charge modification thereon corresponding to the sum of the signals supplied to the recording assembly, so that, unlike a magnetizable recording medium, the different signals from detector 16 may be sequentially supplied to the recording assembly to produce a resultant or composite charge modification of medium 52 corresponding to the sum of the impressed signals. Thus, the desired mixing operation is performed in a single recording operation on medium 52 without the necessity of initially recording the signals to be mixed side by side on a recording medium and then simultaneously reproducing adjacent signals for mixing. The use of this electrostatic, charge-modifiable recording surface thus considerably reduces the amount of equipment required to perform this seismic prospecting method and also considerably increases the speed of operation, since there is no necessity for transferring signals from channel to channel of the recording medium.

When the desired number of seismic disturbances has been obtained, or when the storage capacity of the recorder is reached, the composite signal on medium 52 is reproduced from the recorder by means of including a conductive member 60 forming one plate of a capacitor and disposed to overlie the channel on medium 52 on which the composite signal is recorded. The other plate of the capacitor is formed by the portion of rotor 51 disposed beneath plate 60, and the dielectric, of course, comprises a small air gap and the portion of medium 52 disposed between plate 60 and rotor 52. Plate 60 is connected to one input terminal of an amplifier 61, and the other input terminal of amplifier 61 is connected to the other plate of the capacitor through ground and commutator 59. As medium 52 rotates, variations in the charge distribution of successive portions of medium 52, corresponding to variations in the amplitude of the composite signal are detected by the capacitor formed by plate 60 and rotor 51, and these variations are supplied through amplifier 61 to additional reproducible recording means or, as shown, to suitable recording and/or display means.

The prospecting operation may then be continued in a similar manner to produce a suitable number of seismic disturbances and corresponding seismic detector signals for compositing.

Fig. 3 diagrammatically illustrates an additional alternate embodiment of the invention in which moveout compensation of each of the sequentially produced seismic detector signals is effected through variations in the speed of the reproducible recording medium. In Fig. 3, the seismic detector signals are amplified in amplifier 15 and supplied to recording head 22B, as in Fig. 1. Recorder 22 is provided with a reproducing head 22C which is movable a limited distance about the periphery of recording medium 22A to compensate for the substantially fixed intertrace time variations among the different detector signals.

Recorder 22 is provided with suitable means for producing a signal which is a measure of the speed of rotation of the recording medium. Such means may include a resistor 71 connected to a battery 72 and having a movable tap or slider 73 driven by recorder 22, as shown by the dotted line. A similar network is provided to produce a signal which is a measure of the desired speed of medium 22. Such means may be in the form of a resistor 77 connected to a battery 78 and having an adjustable tap or slider 79 driven by a motor 81. One common terminal of resistor 71 and batterey 72 is connected to ground and to a common terminal of resistor 77 and battery 78. Adjustable taps 73 and 79 are electrically connected through a pair of resistors 82 and 83, and the common junction of resistors 82 and 83 is connected to one input terminal of a control unit 86. The other input terminal of unit 86 is connected to ground and the output of unit 86 is connected through an amplifier 87 to the input of motor 23.

Resistor 77 is tapered or stepped so that its resistance as a function of length is a measure of the speed of rotation of medium 22A required to produce the desired normal moveout compensation. As motor 81 drives adjustable tap 79 of resistor 77, the equipment operates as a function generator to produce a signal which is a measure of the speed at which recording medium 22A should rotate to produce the desired moveout compensation. The difference between the actual speed of medium 22A, as measured by the signal developed across the adjustable portion of resistor 71, and the desired speed of the recorder, as measured by the signal developed across the adjustable portion of resistor 77, is supplied to control unit 86 to furnish a signal for varying the speed of motor 23 to bring the speed of recorder 22 to the desired value. Thus, the speed of rotation of recording medium 22A will be continuously varied during recording to produce the desired variation in the relative time sequence of the different portions of the signal.

In operation, as each of the sequentially produced seismic signals is supplied to recording head 22B, the speed of rotation of recorder 22 is varied according to the desired normal moveout compensation so that the signal as recorded on medium 22A will be effectively corrected for normal moveout. During reproduction of the recorded moveout-compensated signal, reproducing head 22C may be shifted different amounts for reproduction of the different signals to compensate for the substantially constant time variations among the different signals. The reproduced signals are then supplied through amplifier 31 to an appropriate storage bank of recorder 36, where the signals are stored and then reproduced and summed, as described above. Although the method of moveout compensation utilizing variations in the speed of the recording medium has been illustrated and described in connection with the magnetic recording medium of Fig. 1, it will be obvious that the method is equally applicable with an electrostatic medium similar to that of Fig. 2.

Although but a few embodiments of the present invention have been illustrated and described, it will be obvious to those skilled in the art that various changes and modifications may be made therein without departing from the spirit of the invention or the scope of the appended claims.

I claim:

1. The method of seismic exploration comprising the steps of sequentially creating a plurality of seismic disturbances, detecting movement of the earth with a seismic detector in response to each of said plurality of disturbances to produce a plurality of electrical signals varying in sympathy with said movement, sequentially applying said signals to a common portion of an electrostatic, charge-modifiable surface to vary the charge distribution of said surface in accordance with the sum of said applied signals to produce a resultant charge modification of said surface dependent upon the sum of said signals, detecting the resultant charge modification of said surface to produce a composite signal, and recording said composite signal.

2. The method of seismic exploration comprising the steps of sequentially creating a plurality of seismic disturbances, detecting movement of the earth with a seismic detector in response to each of said plurality of disturbances to produce a corresponding plurality of electrical signals varying in sympathy with said movement, sequentially applying each of said signals to a common portion of a rotatable, electrostatic, charge-modifiable surface to vary the charge distribution of said surface in accordance with the sum of said applied signals, varying the speed of rotation of said charge-modifiable surface during application of said signals thereto to vary the relative time sequence of said applied signals, detecting the resultant charge modification of said surface produced by the sum of said time-varied signals to produce a composite signal, and recording said composite signal.

3. The method of seismic exploration comprising the steps of sequentially creating a plurality of seismic disturbances, detecting movement of the earth with a seismic detector in response to each of said plurality of disturbances to produce a corresponding plurality of electrical signals varying in sympathy with said movement, sequentially applying each of said signals to recording means movable about the periphery of an electrostatic, charge-modifiable surface to vary the charge distribution of a common portion of said surface in accordance with the sum of said applied signals, varying the velocity of movement of said recording means relative to said surface during said application of said signals to vary the relative time sequence of each of said applied signals, detecting the resultant charge modification of said surface produced by the sum of said time-varied signals to produce a composite signal, and recording said composite signal.

4. Apparatus for use in seismic exploration where a plurality of seismic disturbances is sequentially produced and movement of the earth in response to each of said disturbances is converted by a seismic wave detector into an electrical signal varying in sympathy with said movement, comprising a recorder having an electrostatic, charge-modifiable surface, recording means movable relative to said surface and connected to said detector for varying the charge distribution of a common portion on said surface in accordance with the sum of said signals, drive means for varying the velocity of movement of said recording means relative to said surface during occurrence of said signals to vary the relative time sequence of said recorded signals, means for detecting variations in the charge distribution on said common portion of said surface produced by the sum of said time-varied signals to produce a composite signal, and means for recording said composite signal.

5. Apparatus for use in seismic exploration where a plurality of seismic disturbances is sequentially produced and movement of the earth in response to each of said disturbances is converted by a seismic wave detector into an electrical signal varying in sympathy with said movement, comprising a recorder having a rotatable, electrostatic, charge-modifiable surface, recording means connecting said detector to said surface to vary the charge distribution on a common portion of said surface in accordance with the sum of said signals, means for varying the speed of rotation of said surface during recording to vary the relative time sequence of each of said recorded signals, means for detecting variations in the charge distribution on said common portion of said surface produced by the sum of said time-varied signals to produce a composite signal, and means for recording said composite signal.

References Cited in the file of this patent

UNITED STATES PATENTS

| | | |
|---|---|---|
| 2,018,737 | Owen | Oct. 29, 1935 |
| 2,088,588 | Dudley | Aug. 3, 1937 |
| 2,243,729 | Ellis | May 27, 1941 |
| 2,394,990 | Eisler et al. | Feb. 19, 1946 |
| 2,440,971 | Palmer | May 4, 1948 |
| 2,463,534 | Hawkins | Mar. 8, 1949 |
| 2,620,890 | Lee et al. | Dec. 9, 1952 |
| 2,698,928 | Pulvari | Jan. 4, 1955 |
| 2,767,389 | McCollum | Oct. 16, 1956 |

OTHER REFERENCES

Publication: "New Approach to Seismic Exploration," World Oil Magazine, June 1954, pages 140, 142, 146, 148, 151, 152, 154, 156 and 158 (pages 140, 142, 146 and 148 relied on).